Nov. 27, 1928.
O. J. SUNDSTRAND
CASH REGISTER
Filed Aug. 15, 1921
1,693,259
2 Sheets-Sheet 1
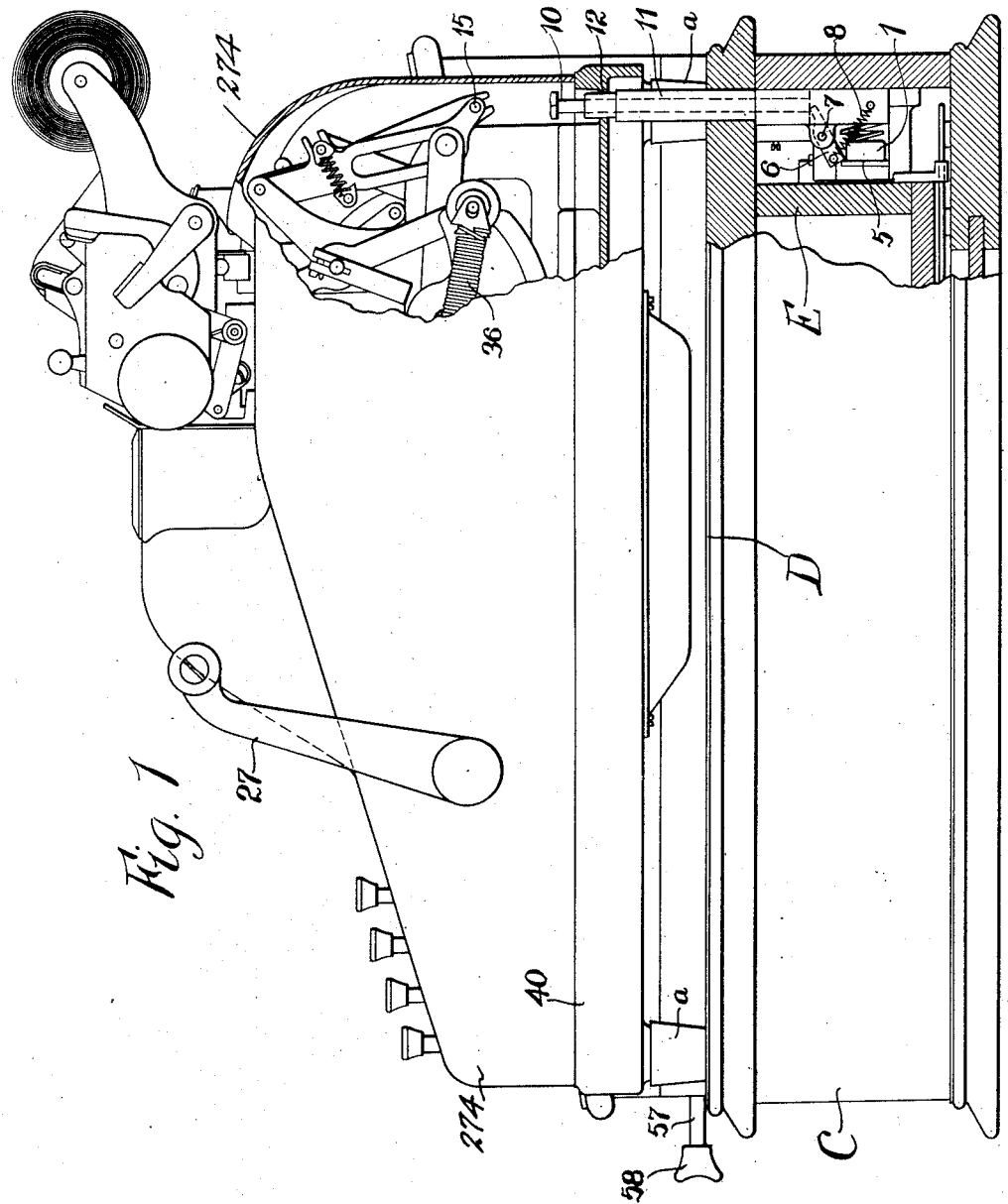
Inventor
O. J. Sundstrand
By Miller Churchill & Parker
Attys.

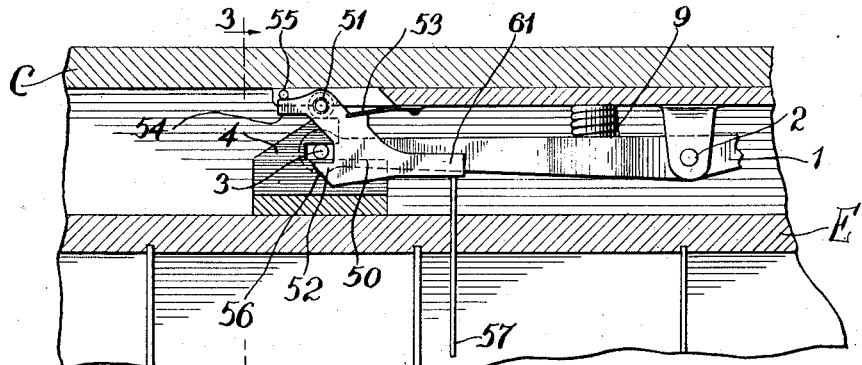
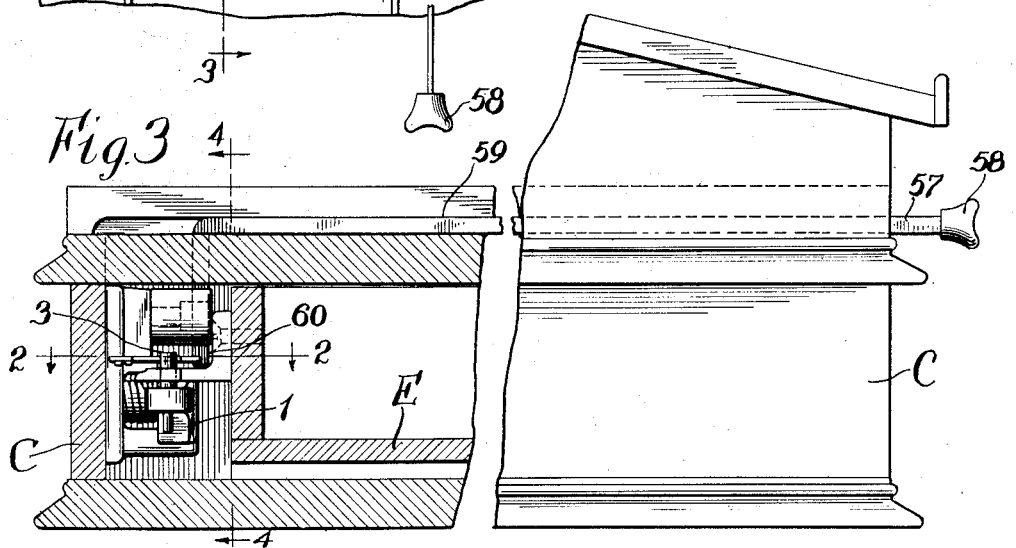
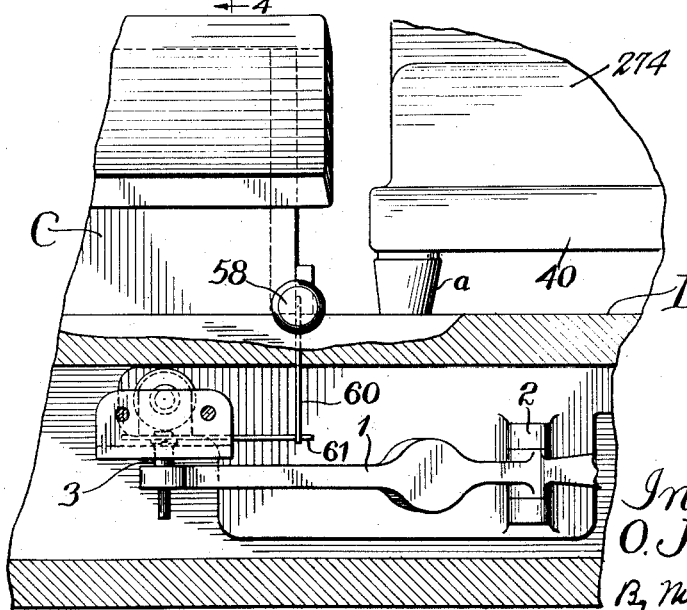

Patented Nov. 27, 1928.

1,693,259

UNITED STATES PATENT OFFICE.

OSCAR J. SUNDSTRAND, OF ROCKFORD, ILLINOIS, ASSIGNOR, BY MESNE ASSIGNMENTS, TO SUNDSTRAND CORPORATION, OF WILMINGTON, DELAWARE, A CORPORATION OF DELAWARE.

CASH REGISTER.

Application filed August 15, 1921. Serial No. 492,244.

This invention has special reference to cash registers of the class consisting of a self-contained adding and listing machine mounted upon a casing containing a cash drawer.

Certain cash registers of the above-mentioned type have heretofore been so arranged that the cash drawer was unlatched and opened whenever the adding and listing machine was operated to add or list an item. Other cash registers of the same general class have been so arranged as to cause the drawer to open when the adding and listing machine was operated to take a grand total.

Various occasions arise for using the adding and listing machine in the performance of operations not related to a contemporaneous cash transaction, as, for example, the listing of checks, the preparation of statements of account, etc., and during the performance of such operations it is undesirable to have the cash drawer standing open.

The particular object of this invention is to provide means for preventing the cash drawer from springing open whenever the adding and listing machine is operated. This result is obtained, in the present embodiment of the invention, by dividing the unlatching operation into two stages or steps, the first step being automatically performed by the adding and listing machine and the final step being manually performed. It will be evident that in this manner the complete unlatching of the cash drawer is under the direct control of the operator, and consequently the machine may be employed to do miscellaneous computing and printing operations without causing automatic unlatching of the drawer.

In the accompanying drawings,

Fig. 1 is a side elevation of a cash register embodying the features of my invention, certain of the parts being shown in section.

Fig. 2 is a horizontal sectional view taken in the plane of line 2—2 of Fig. 3.

Fig. 3 is a section along line 3—3 of Fig. 2.

Fig. 4 is a view showing certain parts in front elevation, other parts being sectioned in the plane of line 4—4 of Fig. 3.

The embodiment which has been selected to illustrate the invention comprises a registering or adding and listing machine substantially identical with the one disclosed in the Sundstrand Patent No. 1,198,487, dated September 19, 1916. Said machine comprises a base 40 which is supported upon rubber feet $a$.

The cabinet or casing that contains the cash drawer may partake of various forms. Herein is shown a casing C, the upper surface of which constitutes a platform or table D upon which the adding and listing machine may be placed. The cash drawer is shown at E.

The means for latching the drawer E in the closed position may be varied considerably without departing from the invention. The present embodiment in some respects resembles that shown in my Patent No. 1,568,300, dated January 5, 1926, and comprises a lever 1 pivoted at 2 in the rear portion of the cabinet C, said lever carrying at one end a stud 3 adapted to engage a hook 4 secured to the rear end of the cash drawer. The other end of the lever 1 carries a projection consisting in this instance of a plate 5, the upper edge of which is arranged to be engaged by a latch 6 which is pivotally supported at 7. A coiled contractile spring 8 normally holds the forward end of the latch 6 down behind the upper edge of the plate 5. A coiled expansive spring 9 (Fig. 2) bearing against the lever 1 normally tends to push the cash drawer forwardly and holds the plate 5 pressed against the latch 6. The rear end of the latch 6 underlies a plunger 10 which is vertically reciprocable in a tubular guide 11 secured to the casing C. The guide 11 projects upwardly above the casing C, its upper portion passing through an opening 12 formed in the base 40 of the adding and listing machine. The mechanism of the adding and listing machine comprises a horizontal rod 15 located in the rear portion of the casing 274 of said machine. Said rod moves downwardly whenever the actuating handle 27 of the machine is pulled forward by the operator. When the handle 27 is released the coiled contractile spring 36 restores the handle to the position shown in Fig. 1 and moves the rod 15 upwardly. The plunger is so located as to be in the path of movement of the rod 15, and therefore when the rod 15 descends the plunger 10 is depressed. The downward movement of the plunger tilts the latch 6 upon its pivot 7 against the tension exerted by the spring 8, whereby the forward end of the latch is disengaged from the plate 5, thus releasing the lever 1 to the action of the spring 9.

To prevent the spring 9 from pushing the cash drawer open until the operator desires to gain access to the drawer, I provide a latch 50 pivoted at 51 on the rear wall of the cash drawer casing C and having a hook 52 adapted to receive the stud 3. A leaf spring 53 normally holds the hook 52 in position to restrain the stud 3, the movement of the latch under the impulse of the spring 53 being limited by contact of a stop finger 54 on said latch with a stop pin 55 on the rear wall of the cash drawer casing C. The forward side of the hook 52 is beveled, as shown at 56, so that the stud 3 may push the latch aside when the operator closes the cash drawer.

The means for manually operating the latch 50 may be of any preferred construction. Herein is shown a rod 57 extending forwardly from a point adjacent to said latch to a point adjacent to the front of the cabinet C and within convenient reach of the operator. On the forward end of the rod 57 is a button or disk 58. The rod 57 may be guided in any suitable manner, as for example, by means of a guideway 59 in the cabinet. The rear portion 60 of the rod 57 is bent downwardly into position to engage the arm 61 of the latch 50.

In practice, the adding and listing machine may be employed in the usual manner for registering sales, making lists of items, preparing statements of account, and the like. The first time the handle 27 is pulled the latch 6 is disengaged from the plate 5, whereby the lever 1 is released to the action of the spring 9. The cash drawer, however, is opened only to the extent determined by the play or clearance between the stud 3 and the hook 52, the drawer remaining closed for all practical purposes. If the operator desires to gain access to the contents of the cash drawer, he pushes the rod 57 rearwardly, thereby causing the latch 50 to swing upon its pivot 51 so as to carry the hook 52 out of the path of the stud 3, whereupon the spring 9 turns the lever 1 in the direction to push the drawer into open position, the stud 3 moving out of engagement with the hook 4. When the operator closes the drawer, the stud 3 slips past the beveled surface 52, the latch 50 automatically returning to its normal position and the latch 6 dropping behind the plate 5, thus latching the drawer in closed position. It will be seen that the operator may use the adding and listing machine in the performance of operations not connected with contemporaneous cash transactions without having the cash drawer spring into open position.

The latch 6 may be termed a primary latch for holding the drawer E in closed position and the latch 50 may be considered a secondary latch for locking the drawer. These terms have been employed in certain of the following claims, without, however, intending to limit the claims to the means herein disclosed, as I desire to have the claims construed broadly.

I claim as my invention.

1. The combination of a casing, a cash drawer in the casing, a hook on the cash drawer, a lever in said casing having a stud arranged to engage said hook, a spring tending to move the lever to advance the drawer in said casing and disengage the stud from the hook, a registering machine on said casing, a primary latch for said lever, said latch being releasable by said registering machine, whereupon said spring partially opens the drawer, a secondary latch located in said casing and adapted to restrain said lever against the influence of said spring, and manually operable means for disengaging the secondary latch from said lever.

2. The combination of a casing, a cash drawer in the casing, a spring in the casing tending to advance the drawer, a drawer latch in the rear portion of the casing, a tubular guide fixed in the rear portion of the casing and extending above the top of the casing, a plunger vertically reciprocable in the guide and arranged to operate the latch to release the drawer to the action of said spring, a registering machine removably mounted on the top of the casing and having an opening in its base into which said guide projects, said plunger projecting above the guide and being arranged to be moved by the registering machine, a latch to control the drawer when the latter is released to the action of the spring, and a manually movable member mounted on the casing and arranged to operate said latch.

3. A till accessory for an adding and listing machine having an operating handle comprising a case separate and detached from an adding and listing machine removably placed thereon and supported thereby, a drawer in said case, a spring in said case tending to project the drawer, two latches in said case to restrain the drawer under the influence of said spring, a device carried by the case in position to be depressed when the adding and listing machine is actuated by said handle; said device being arranged to operate one of the latches to release the drawer to the action of said spring, and another device also carried by said case for operating the other latch to release the drawer to the action of the spring.

In testimony whereof, I have hereunto set my hand.

OSCAR J. SUNDSTRAND.